(12) United States Patent
Rozman et al.

(10) Patent No.: US 7,876,542 B2
(45) Date of Patent: *Jan. 25, 2011

(54) GENERATOR FOR GAS TURBINE ENGINE HAVING DC BUS FAULT SHORT CIRCUIT CONTROL USING A BATTERY

(75) Inventors: Gregory I. Rozman, Rockford, IL (US); Kevin Dooley, Mississauga (CA); Vijay K. Maddali, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 686 days.

This patent is subject to a terminal disclaimer.

(21) Appl. No.: 11/839,823

(22) Filed: Aug. 16, 2007

(65) Prior Publication Data

US 2009/0045293 A1   Feb. 19, 2009

(51) Int. Cl.
B64D 31/00   (2006.01)

(52) U.S. Cl. .................. 361/87; 244/53 B

(58) Field of Classification Search ............ 307/64, 307/9.1; 290/40; 416/127; 60/778; 323/284; 361/87; 244/53 B
See application file for complete search history.

(56) References Cited

U.S. PATENT DOCUMENTS

| | | | | |
|---|---|---|---|---|
| 2,564,785 A | * | 8/1951 | Kueppers | 361/21 |
| 4,927,329 A | * | 5/1990 | Kliman et al. | 416/127 |
| 5,555,722 A | * | 9/1996 | Mehr-Ayin et al. | 60/788 |
| 5,939,800 A | * | 8/1999 | Artinian et al. | 307/64 |
| 5,977,645 A | * | 11/1999 | Glennon | 290/40 F |
| 6,344,700 B1 | * | 2/2002 | Eisenhauer et al. | 307/64 |
| 6,825,640 B1 | | 11/2004 | Hill | |
| 6,920,023 B2 | | 7/2005 | Dooley | |
| 6,936,948 B2 | | 8/2005 | Bell | |
| 6,965,183 B2 | | 11/2005 | Dooley | |
| 7,126,313 B2 | | 10/2006 | Dooley | |
| 2004/0119454 A1 | * | 6/2004 | Chang et al. | 323/284 |
| 2006/0061213 A1 | * | 3/2006 | Michalko | 307/9.1 |
| 2006/0113967 A1 | | 6/2006 | Dooley | |
| 2006/0226721 A1 | | 10/2006 | Dooley | |

* cited by examiner

Primary Examiner—Jared J Fureman
Assistant Examiner—Angela Brooks
(74) Attorney, Agent, or Firm—Carlson, Gaskey & Olds, P.C.

(57) ABSTRACT

An aircraft electrical system comprises a generator to be driven as part of a gas turbine engine. The generator supplies electrical power to a plurality of accessories associated with the gas turbine engine, and to an aircraft DC bus in parallel to the supply to the accessories. A battery supplies voltage to a control circuit for the generator through a selectively opened and closed switch. A control detects a short circuit on the aircraft DC bus. The battery switch allows power from the battery to flow to provide control voltage for the generator when the control detects a short circuit on the aircraft DC bus.

19 Claims, 3 Drawing Sheets

GENERATOR FOR GAS TURBINE ENGINE HAVING DC BUS FAULT SHORT CIRCUIT CONTROL USING A BATTERY

BACKGROUND OF THE INVENTION

This application relates to an electric system for a generator in a gas turbine engine, which generates power for both a related aircraft through a power bus, and engine accessories through an accessory bus. A battery is included to ensure that a control voltage still flows to the generator in the event of a short circuit on the aircraft power bus.

A power generating system converts motive power generated by a prime mover, such as gas turbine engine to DC electrical power that is supplied to a DC bus to which various aircraft electrical components may be connected.

Recently, electric engine architecture has been developed which includes an integrated generator associated with a gas turbine engine. Power generated by the generator flows to an aircraft DC bus and, also to a plurality of engine accessories. Thus, the engine accessories are powered directly by the generated electric power and the power for other aircraft functions is also supplied from the generator. The DC bus and the accessories are in parallel relative to each other.

There is a potential with this arrangement that a short circuit on the DC power bus can divert power from the engine accessories. In addition, a voltage regulator for controlling the aircraft DC bus voltage will receive no control voltage in the event of a short circuit. In the known system, the control voltage is received from the DC bus. However, in the event of a short circuit, there would be no control voltage.

SUMMARY OF THE INVENTION

In the disclosed embodiment of this invention, a control monitors a DC bus on an aircraft for short circuits. If a short circuit is detected, then a switch is opened to disconnect the DC bus from at least one engine accessory which is provided power in parallel with the DC bus when the switch is closed. At the same time, control voltage is delivered to the generator from a battery. In this manner, the accessories can continue to be driven until the short circuit is corrected.

These and other features of the present invention can be best understood from the following specification and drawings, the following of which is a brief description.

DETAILED DESCRIPTION OF THE PREFERRED EMBODIMENT

Figure 1:
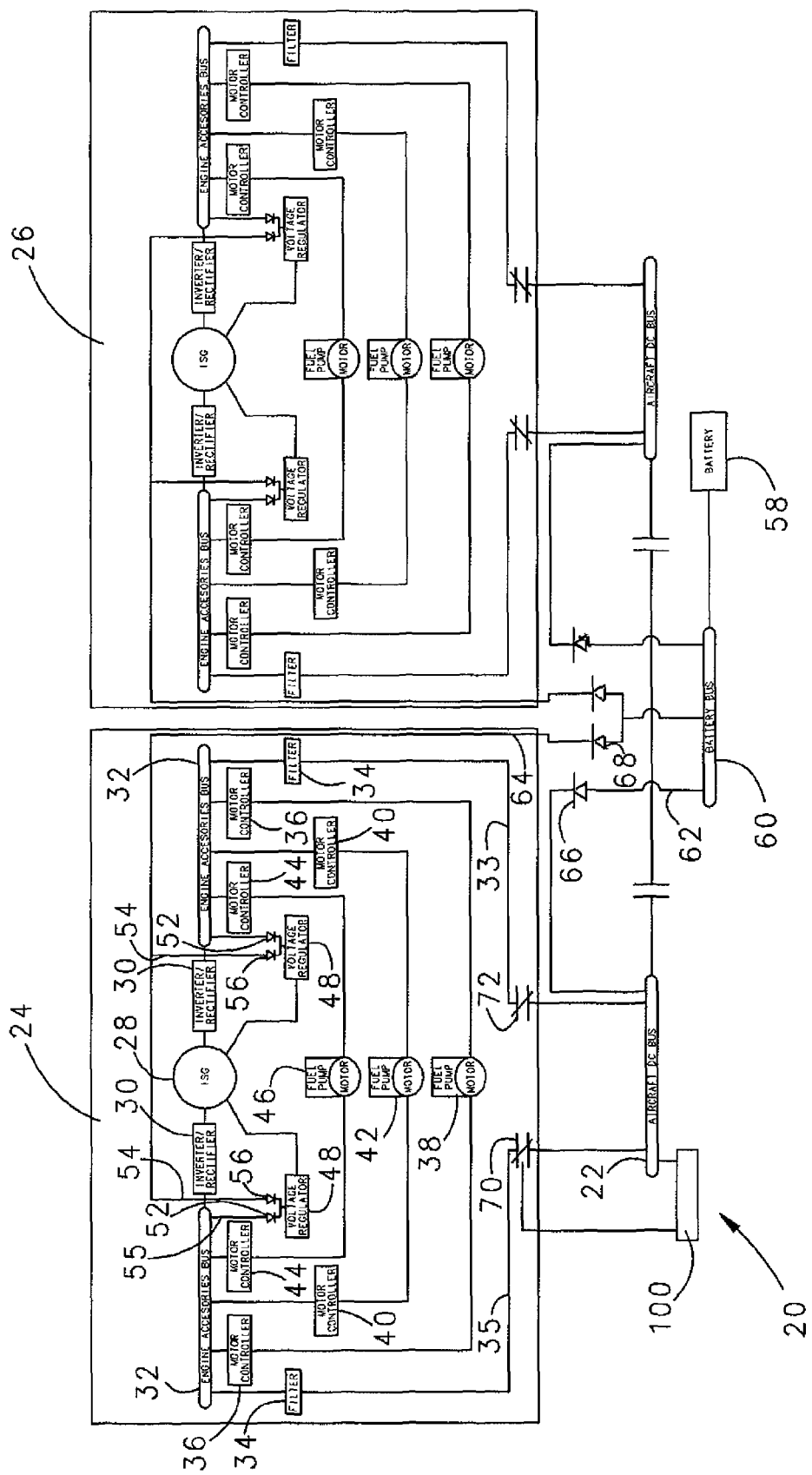
FIG. 1 shows a schematic for a pair of gas turbine engines associated with an aircraft.

FIG. 1 shows a system 20 including a pair of engines 24 and 26 associated with an aircraft. The electrical system for engine 24 will be described, but it should be understood that engine 26 has a similar system. An aircraft DC bus 22 receives power from a generator 28, as will be explained. In one embodiment, the generator is a permanent magnet generator, but this application does extend to other type generators. A pair of inverter/rectifiers 30 receive the power generated by the generator 28, and distribute that power to an engine accessory bus 32. Power from the engine accessory bus 32 passes through filters 34, and through lines 33 and 35 to the aircraft DC bus 22. Motor controllers 36, 40 and 44 provide control to an air pump and its motor 38, a lube pump and its motor 42, and a fuel pump and its motor 46.

As illustrated, generator 28 is an integrated starter-generator. However, it should be understood that this application extends not only to an integrated starter-generator operating in a generator mode, but also to stand-alone generators.

One such known electrical system is disclosed in United States published patent applications 2004/039202A1, 2006/0226721A1, and 2006/0113967A1. The present invention is directed to improving upon these basic systems, as will be described below.

One concern with the basic arrangement of the system 20 occurs if a short circuit occurs on the aircraft DC bus 22. Since the accessory motors 38, 42 and 46 are in parallel with the aircraft DC bus 22, they will be drained to the short circuit on the aircraft DC bus 22. Thus, power will not flow to the motors 38, 42 and 46. Of course, the air pump, lube pump and fuel pump are flight critical components for the associated gas turbine engines 24 and 26, and it is important to maintain their operation.

To address a potential short circuit, the present invention incorporates a control 100 which can sense when a short circuit occurs on the aircraft DC bus 22. Switch 70 is controlled by the control 100. Of course, the control 100 may be the main controller for the engine, and can communicate with many more items. However, for purposes of understanding this invention, all that need be understood is the control 100 controls the switch 70.

A voltage regulator 48 receives control voltage, normally from a line 55 passing through a diode 52. However, an alternate line 54 provides power to the voltage regulator 48 through a diode 56. A battery bus 60 is connected to a battery 58, and through a line 62, and diode 66 to the aircraft DC bus 22. The battery bus also provides power through a diode 68 to a line 64 connected to the alternate control line 54.

FIG. 1 shows a normal power generation mode, such as would occur when the aircraft is in flight. The gas turbine engine drives the generator 28, and power is generated to power the motors 38, 42 and 46, and to deliver additional power to the aircraft DC bus 22.

Figure 2:
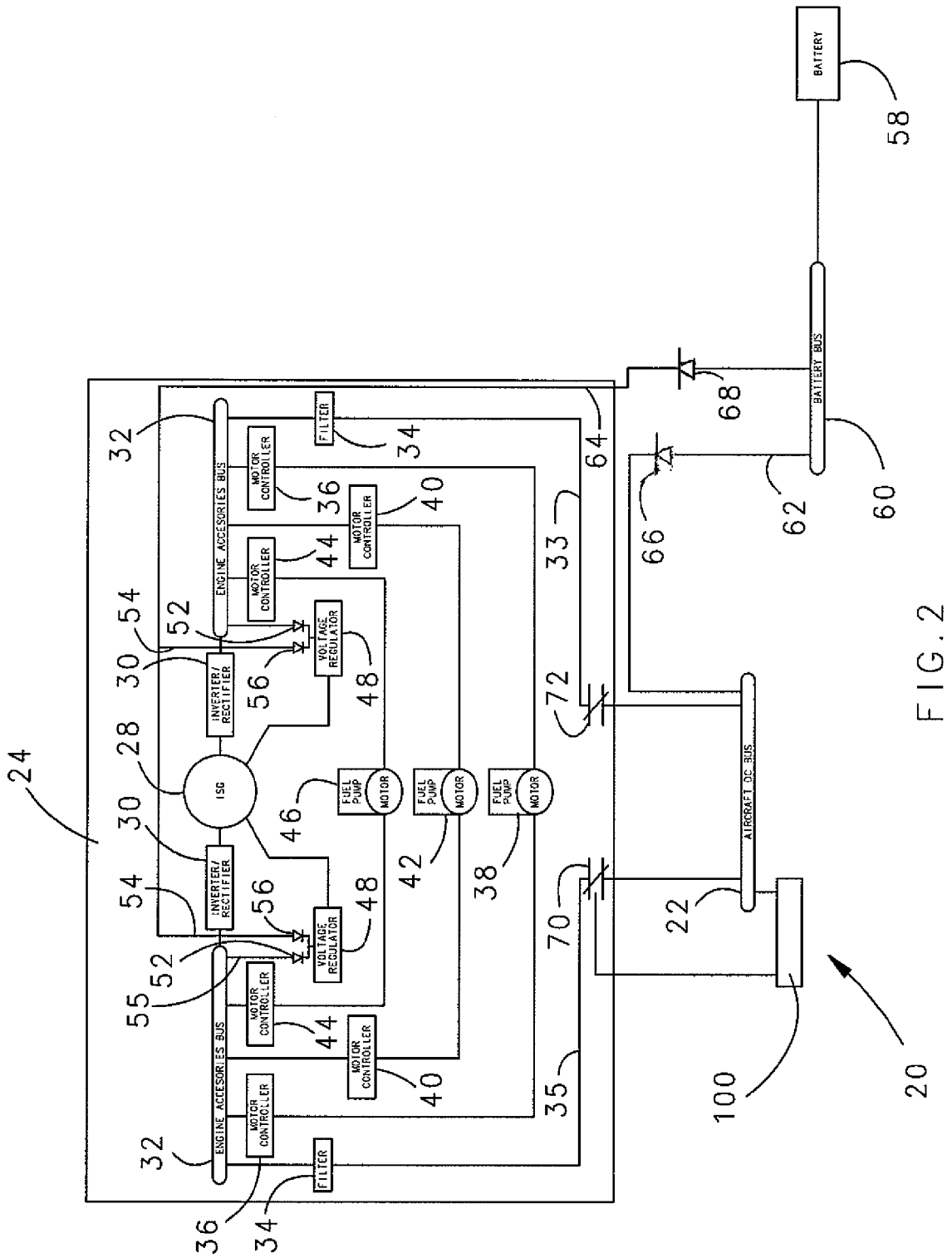
FIG. 2 shows one of the engines of FIG. 1 in a start mode.

FIG. 2 shows a start mode. In the start mode of FIG. 2, the switches 70 and 72 are maintained closed. The diode 66 allows power to flow from the battery to the bus 22, and this power will then flow to the generator, to begin to operate the generator as a motor to start the gas turbine engine. Power will not flow from the battery through the diode 68, as there will be a higher voltage (typically 28 volts) on the engine accessory bus at this time than is supplied by the battery (typically 24 volts), and the diode 68 will be anti-biased.

Figure 3:
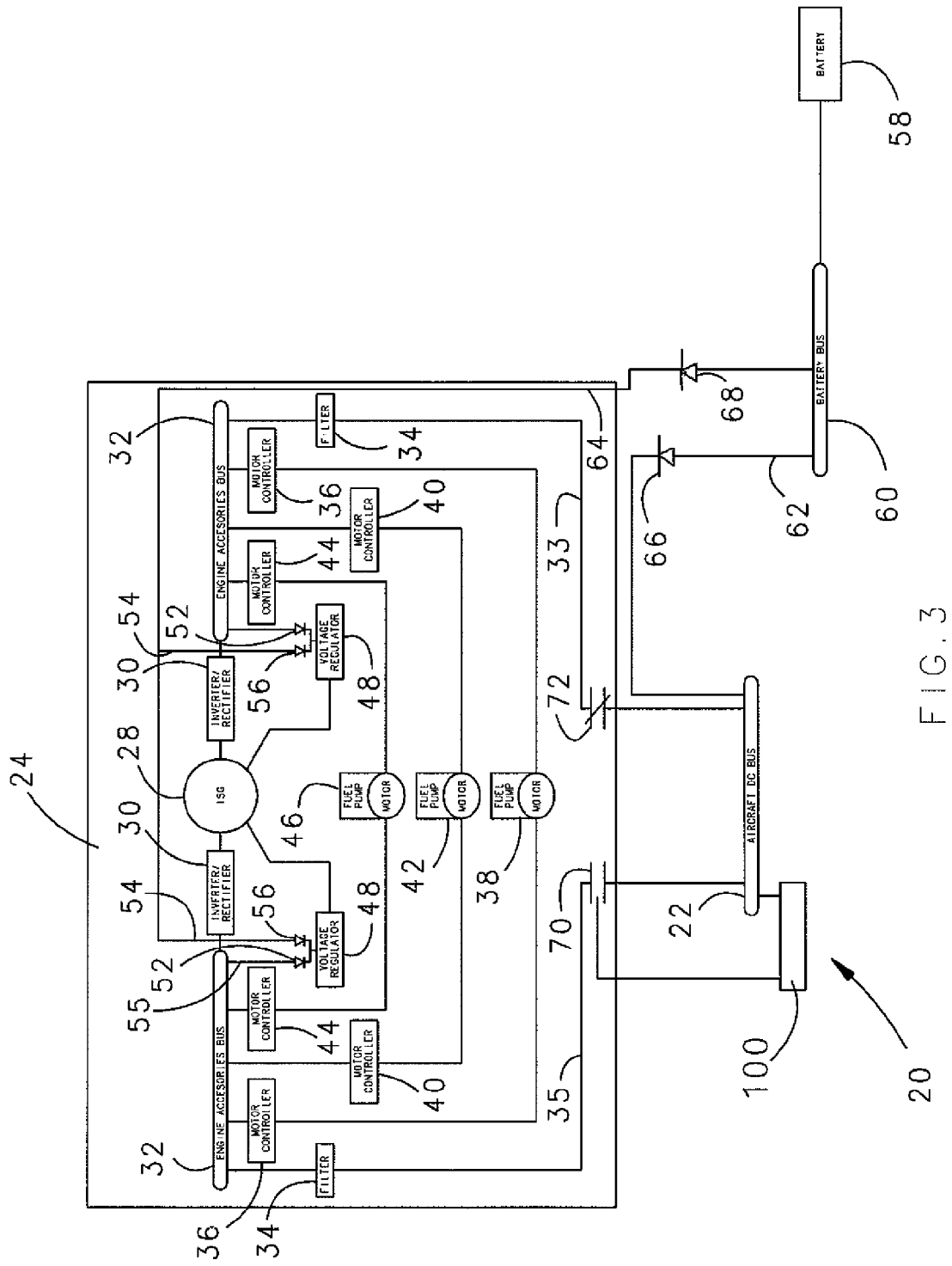
FIG. 3 shows one of the engines of FIG. 1 in a position to correct for a short circuit on an aircraft DC power bus.

FIG. 3 shows the arrangement when the control 100 has detected a short circuit on the aircraft DC bus 22. Under this condition, the control 100 opens the switch 70. The diode 68 will now allow power to flow from the battery 58 to the control line 54, through the diode 56 and to the voltage regulator 48. Since the switch 70 is opened, power will not be drained from the engine accessory bus, but will continue to drive the motors 38, 42 and 46. At the same time, the battery, through the voltage flowing through the diode 68, will continue to provide the control voltage to voltage regulator 48 as necessary to power the generator. After some short period of time, the short circuit is corrected, and the control 100 can then close the switch 70. Once the switch 70 is closed, a higher voltage will be seen on the engine accessory bus than is supplied by the battery 58. At that time, the diode 68 will be anti-biased and power will not flow from the battery. As can be seen, the diode 66 is also anti-biased in this condition and blocks the power flow from the battery 58 to the aircraft dc bus.

While diodes 66 and 68 are disclosed, powered switches controlled by the control 100 can replace the diodes 66 and 68.

The present invention thus provides a method of avoiding any concerns with a short circuit on an aircraft DC bus, in an engine architecture where a plurality of engine accessories are mounted in parallel with the bus.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An aircraft electrical system comprising:
   a generator to be driven as part of a gas turbine engine;
   said generator supplying electrical power to a plurality of accessories associated with the gas turbine engine, and said generator supplying power to an aircraft DC bus in parallel to the supply to said accessories;
   a battery for supplying voltage to a control circuit for said generator through a selectively opened and closed battery switch; and
   a control for detecting a short circuit on said aircraft DC bus, and said battery switch allowing voltage from the battery to provide control voltage for the generator when said control detects a short circuit on the aircraft DC bus.

2. The aircraft electrical circuit as set forth in claim 1, wherein said battery switch is a diode that allows power flow when a voltage from the battery is higher than a voltage at a control circuit.

3. The aircraft electrical circuit as set forth in claim 1, wherein said battery is also connected to the aircraft DC bus through a second battery switch, with power from the battery flowing to the aircraft DC bus through the second battery switch in a start mode.

4. The aircraft electrical circuit as set forth in claim 1, wherein said generator supplies power to an engine accessory bus, and power flowing from the engine accessory bus in parallel to said engine accessories, and also to said aircraft DC bus.

5. The aircraft electrical system as set forth in claim 1, wherein said accessories include at least a fuel pump and a lube pump.

6. The aircraft electrical system as set forth in claim 1, wherein said battery supplies a control voltage to a voltage regulator for the generator through the battery switch.

7. The aircraft electrical system as set forth in claim 1, wherein said control also opening a power switch to break power flow between said generator and said aircraft DC bus when a short circuit is detected.

8. An electrical system and engine for an aircraft comprising:
   an aircraft DC bus;
   a generator for supplying electrical power to the aircraft DC bus, said generator being associated with a gas turbine engine, such that rotation of the gas turbine engine generates electrical power for supply to the aircraft DC bus, and said generator further supplying electrical power to at least an engine fuel pump and an engine lube pump in parallel to the supply of electrical power to the aircraft DC bus;
   a battery selectively supplying voltage through a first battery switch to a voltage regulator for the generator, said voltage regulator for said generator also receiving electrical power from the aircraft DC power bus; and
   a power switch for selectively disconnecting said aircraft DC bus from said generator, and a control for detecting a short circuit on the aircraft DC bus, said control being operable to open said power switch when a short circuit is detected, with said first battery switch then supplying control voltage to said voltage regulator, such that said engine fuel pump and said engine lube pump can continue to be driven while the short circuit is occurring on the aircraft DC bus.

9. The electrical system and engine as set forth in claim 8, wherein said first battery switch is a diode that allows power flow when a voltage from the battery is higher than a voltage at the voltage regulator.

10. The electrical system and engine as set forth in claim 8, wherein said battery is also connected to the aircraft DC bus through a second battery switch, with power from the battery flowing to the aircraft DC bus through the second battery switch in a start mode.

11. The electrical system and engine as set forth in claim 8, wherein said generator supplies power to an engine accessory bus, and power flowing from the engine accessory bus in parallel to said engine accessories, and also to said aircraft DC bus.

12. The electrical system and engine as set forth in claim 8, wherein there are a pair of said gas turbine engines and said generators, said pair of generators supplying power to a common aircraft DC bus, and communicating with a common battery.

13. A method of operating an aircraft electrical system including the steps of:
   (1) providing a generator to be driven as part of a gas turbine engine;
   (2) said generator supplying electrical power to a plurality of accessories associated with the gas turbine engine, and said generator supplying power to an aircraft DC bus in parallel to the supply to said accessories;
   (3) a battery supplying voltage to a control circuit for said generator through a selectively opened and closed battery switch; and
   (4) detecting a short circuit on said aircraft DC bus, and said battery switch allowing voltage from the battery to provide control voltage for the generator when a short circuit is detected on the aircraft DC bus.

14. The method as set forth in claim 13, wherein said battery switch is a diode that allows power flow when a voltage from the battery is higher than a voltage at a control circuit.

15. The method as set forth in claim 13, wherein said battery is also connected to the aircraft DC bus through a second battery switch, with power from the battery flowing to the aircraft DC bus through the second battery switch in a start mode.

16. The method as set forth in claim 13, wherein said generator supplies power to an engine accessory bus, and power flowing from the engine accessory bus in parallel to said engine accessories, and also to said aircraft DC bus.

17. The method as set forth in claim 13, wherein said accessories include at least a fuel pump and a lube pump.

18. The method as set forth in claim 13, wherein said battery supplies a control voltage to a voltage regulator for the generator through the battery switch.

19. The method as set forth in claim 13, wherein a power switch is opened to break communication between said generator and said aircraft DC bus when a short circuit is detected.

* * * * *